US010564060B2

(12) United States Patent
Schofield

(10) Patent No.: US 10,564,060 B2
(45) Date of Patent: Feb. 18, 2020

(54) PRESSURE SENSING DEVICES, SYSTEMS, AND METHODS FOR ALLEVIATING INTERFERENCE FROM MOISTURE

(71) Applicant: General Electric Company, Schenectady, NY (US)

(72) Inventor: Ronald Bruce Schofield, Clarksville, OH (US)

(73) Assignee: General Electric Company, Schenectady, NY (US)

( * ) Notice: Subject to any disclaimer, the term of this patent is extended or adjusted under 35 U.S.C. 154(b) by 143 days.

(21) Appl. No.: 15/892,918

(22) Filed: Feb. 9, 2018

(65) Prior Publication Data

US 2019/0250058 A1  Aug. 15, 2019

(51) Int. Cl.
*G01L 19/06* (2006.01)
*F01D 21/00* (2006.01)
*G01L 9/00* (2006.01)

(52) U.S. Cl.
CPC ........ *G01L 19/0654* (2013.01); *F01D 21/003* (2013.01); *G01L 9/0072* (2013.01); *F05D 2220/323* (2013.01); *F05D 2300/611* (2013.01)

(58) Field of Classification Search
CPC . G01L 19/0654; G01L 9/0072; F01D 21/003; F05D 2300/611; F05D 2220/323
See application file for complete search history.

(56) References Cited

U.S. PATENT DOCUMENTS

| 5,541,857 | A | * | 7/1996 | Walter | G01H 1/006 |
| | | | | | 415/26 |
| 5,792,958 | A | * | 8/1998 | Speldrich | G01L 19/06 |
| | | | | | 338/42 |
| 6,871,487 | B2 | | 3/2005 | Kurtz et al. | |
| 7,538,401 | B2 | | 5/2009 | Eriksen et al. | |
| 7,765,875 | B2 | | 8/2010 | Guo | |
| 7,861,595 | B2 | * | 1/2011 | Brown | G01L 19/0645 |
| | | | | | 73/706 |
| 8,001,761 | B2 | | 8/2011 | Myers, Jr. et al. | |
| 8,413,494 | B1 | | 4/2013 | Lebron | |
| 8,943,895 | B2 | * | 2/2015 | Barron | G01L 19/0046 |
| | | | | | 73/718 |
| 9,588,309 | B2 | * | 3/2017 | Craddock | G02B 6/4251 |
| 9,689,766 | B2 | * | 6/2017 | Lemke | G01L 9/0042 |
| 10,065,853 | B2 | * | 9/2018 | Golden | G01L 13/025 |
| 2010/0281994 | A1 | | 11/2010 | Brown et al. | |

(Continued)

FOREIGN PATENT DOCUMENTS

EP  2618123 A2  7/2013

*Primary Examiner* — Freddie Kirkland, III
(74) *Attorney, Agent, or Firm* — Dority & Manning, P.A.

(57) ABSTRACT

A pressure sensing device with a tubular pressure port including an internal chamfer adjacent to a deflectable diaphragm, and/or a hydrophobic or superhydrophobic coating applied to at least a portion of the tubular pressure port, the internal chamfer, and/or the deflectable diaphragm. The internal chamfer and/or the hydrophobic or superhydrophobic coating are configured at least in part to reduce adhesive forces between condensation and the surface of the tubular pressure port, to reduce the tendency for capillary action to draw condensation towards the deflectable diaphragm, and/or to increase the tendency for capillary action or gravity to draw condensation away from the deflectable diaphragm and out of the tubular pressure port.

20 Claims, 9 Drawing Sheets

(56) References Cited

U.S. PATENT DOCUMENTS

2013/0219902 A1 8/2013 Harris
2017/0205303 A1* 7/2017 Sanden .................. G01L 13/06
2017/0350783 A1* 12/2017 Sixtensson ............ G01L 19/145

* cited by examiner

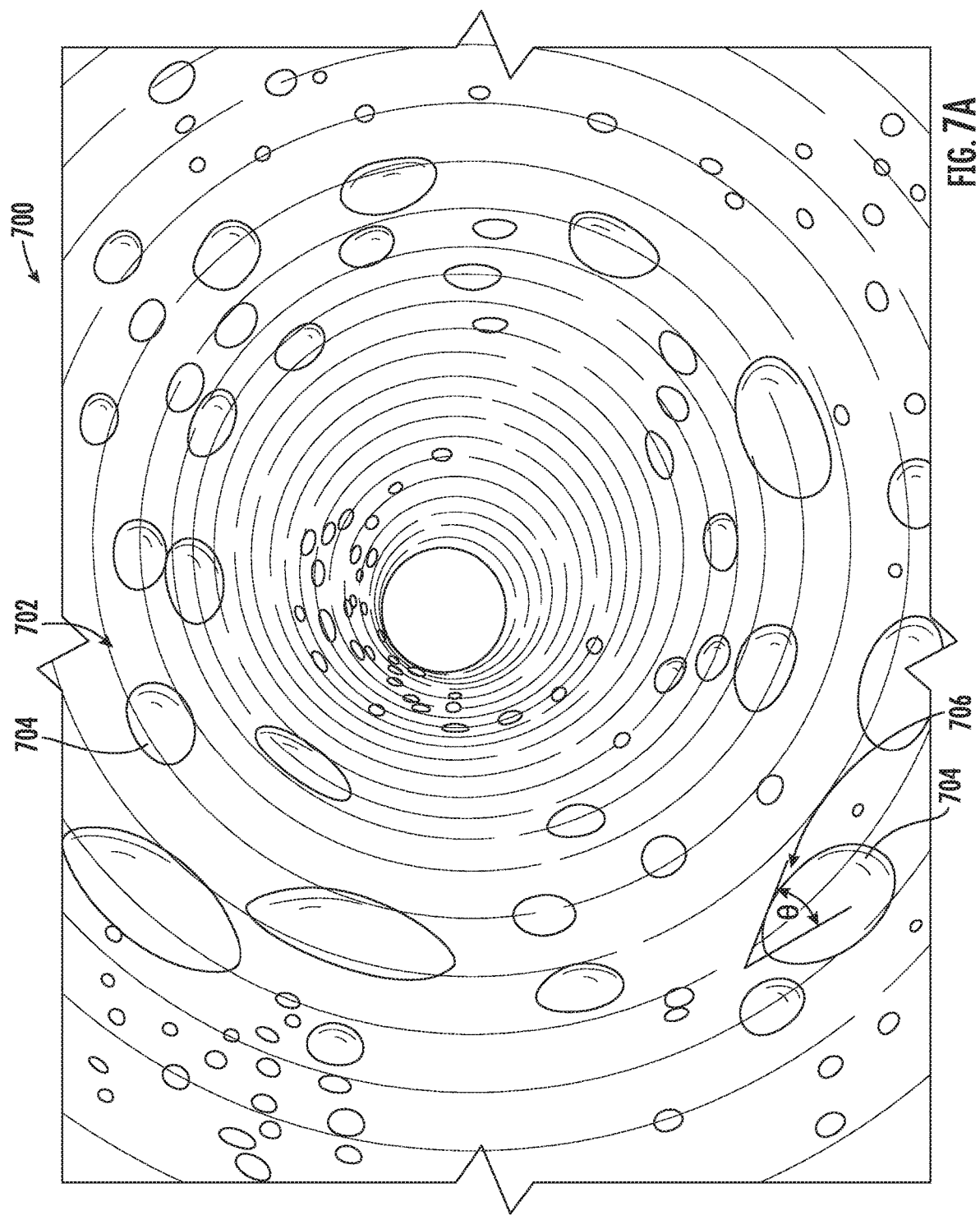

PRESSURE SENSING DEVICES, SYSTEMS, AND METHODS FOR ALLEVIATING INTERFERENCE FROM MOISTURE

FIELD OF TECHNOLOGY

The present disclosure generally relates to pressure sensing devices and related systems and methods, and more particularly, to pressure sensing devices and systems with improved robustness to condensing or freezing moisture, and methods of alleviating interference from moisture in such pressure sensing devices or systems.

BACKGROUND

Moisture condensing or freezing in a pressure sensor can lead to erroneous pressure signals or damage to the sensor. Pressure sensors in turbomachine engines such as a turbofan engine on an aircraft are particularly vulnerable to moisture accumulation. Engine control systems for a turbomachine rely on pressure signals taken from high pressure aspects of the turbomachine for critical operations such as thrust control. These pressure sources may contain a significant amount of moisture vapor under pressure which may cool and condense inside of a pressure sensor. Moreover, turbomachine engines often operate under atmospheric conditions in which moisture in a pressure sensor is susceptible to freezing. This condensation or ice within a pressure sensor may plug a pressure port or pressure supply line, or may interact with a diaphragm or other component of the pressure sensor, inhibiting the pressure sensor from accurately sensing pressure changes. An erroneous pressure signal or a failed pressure sensor can result in an inability to start the turbomachine engine or a loss of thrust control during operation, among other issues. These issues can be the cause of costly delays and potential safety concerns.

Efforts have been made to remove moisture from a pressure sensor and to reduce the tendency for condensation to freeze in a pressure sensor or supply line. For example, there are pressure sensing systems that include a weep hole that allows condensation to escape, and there are also pressure sensing systems that have a heater to prevent condensation from freezing. Nevertheless, condensing or freezing moisture in pressure sensor systems remains a concern, particularly for turbomachine powered aircraft and other applications with turbomachines operating in a sub-freezing atmosphere. Accordingly, there exists a need for improved pressure sensing devices, systems and methods that alleviate interference from moisture which may condense or freeze in a pressure port or pressure sensor supply line.

BRIEF DESCRIPTION

Aspects and advantages will be set forth in part in the following description, or may be obvious from the description, or may be learned through practice of the presently disclosed subject matter.

In one aspect the present disclosure provides pressure sensing devices. In an exemplary embodiment, a pressure sensing device includes a housing defining a pressure sensing chamber and a tubular pressure port, a deflectable diaphragm separating the pressure sensing chamber from the tubular pressure port, and a sensing electrode configured to ascertain a capacitance value corresponding to the pressure in the tubular pressure port in response to a deflection of the deflectable diaphragm.

The tubular pressure port may include an internal chamfer adjacent to the deflectable diaphragm. The internal chamfer defines a cross-sectional width of the tubular pressure port that increases from a first width proximal to the deflectable diaphragm to a second width distal to the deflectable diaphragm. The internal chamfer may include a linear surface or a curved surface, and may have a slope between 10 to 80 degrees. The first width of the internal chamfer may be between 0.02 to 0.12 inches, and the second width of the internal chamfer may be between 0.08 to 0.18 inches, such that the second width is greater than the first width.

In some embodiments, at least a portion of the tubular pressure port, the internal chamfer, and/or the deflectable diaphragm comprises a hydrophobic or superhydrophobic coating. The hydrophobic or superhydrophobic coating may include one or more of: a fluoropolymer, a polystyrene nano-composite, calcium carbonate particles, carbon nanotubes, silica nanoparticles, a fluorinated silane, and a hydrophobic oil. At least a portion of the tubular pressure port may include a first hydrophobic or superhydrophobic coating that exhibits a first contact angle, and at least a portion of the internal chamfer may include a second hydrophobic or superhydrophobic coating that exhibits a second contact angle, and/or at least a portion of the deflectable diaphragm may include a third hydrophobic or superhydrophobic coating that exhibits a third contact angle. In some embodiments, the second contact angle may exceed the first contact angle and/or the third contact angle, and/or the third contact angle may exceed the first contact angle.

In accordance with the present disclosure, the internal chamfer and/or the hydrophobic or superhydrophobic coating may be configured at least in part to reduce adhesive forces between the condensation and the surface of the tubular pressure port (and/or the internal chamfer or deflectable diaphragm), to reduce the tendency for capillary action to draw condensation towards the deflectable diaphragm, and/or to increase the tendency for capillary action or gravity to draw condensation away from the deflectable diaphragm and out of the tubular pressure port.

In another aspect, the present disclosure provides pressure sensing systems. An exemplary pressure sensing system may be implemented with a turbomachine engine. An exemplary system may include a pressure sensor configured in accordance with the present disclosure, a pressure sensor supply line providing fluid communication between the pressure source, such as in a turbomachine engine, and the tubular pressure port of the pressure sensor. The pressure sensor supply line typically includes a weep hole located at a low elevation point in the line to drain condensation. The pressure source may include a location selected to provide pressure readings for airflow discharging a compressor in the turbomachine engine (e.g., a high pressure compressor or a low pressure compressor), or any other location in accordance with the present disclosure.

In yet another aspect, the present disclosure provides methods of alleviating interference from moisture in a pressure sensing device or system. The methods may be carried out using a pressure sensing system used in connection with a turbomachine engine control system, or in any other context in accordance with the present disclosure. An exemplary method includes sensing a pressure from a pressure source using a pressure sensor configured in accordance with the present disclosure, with a pressure sensor supply line that provides fluid communication between the pressure source and the tubular pressure port of the pressure sensor. The method continues with accumulating moisture in the tubular pressure port, and drawing condensation away from the deflectable diaphragm of the pressure sensor and out of the tubular pressure port, at least in part by: reducing adhesive forces between the condensation and the surface of the tubular pressure port, reducing the tendency for capillary action to draw condensation towards the deflectable diaphragm, and/or increasing the tendency for capillary action or gravity to draw condensation away from the deflectable diaphragm and out of the tubular pressure port. The moisture passes into a pressure sensor supply line, and the method concluded with draining the moisture out of a weep hole located at a low elevation point in the line.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figures, in which:

FIG. 7A shows moisture droplets condensed inside a tubular pressure port or supply line that has a hydrophilic surface.

Figure 1:
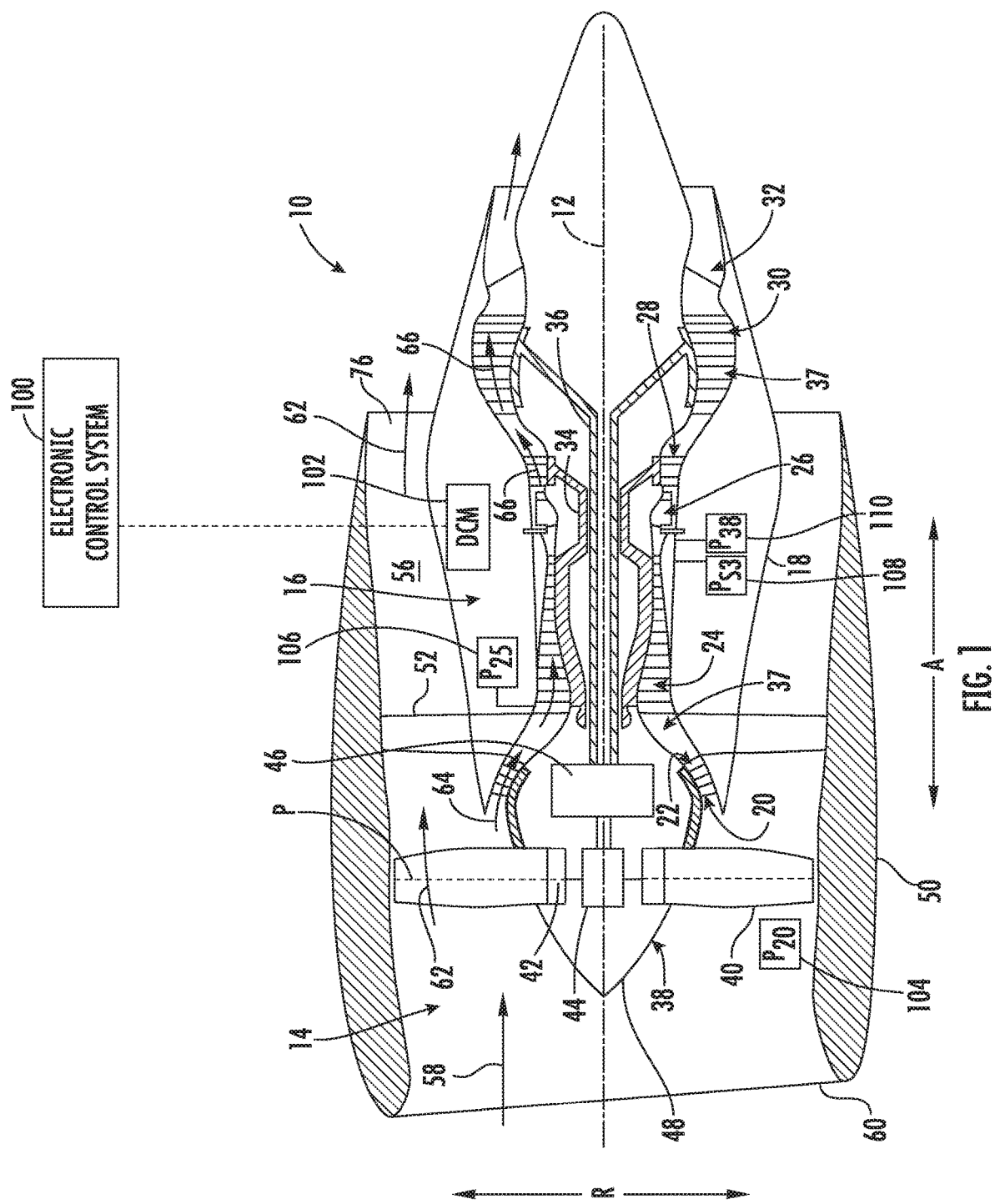
FIG. 1 is a schematic, cross-sectional view of an exemplary gas turbine engine in accordance with various embodiments of the present disclosure.

Repeat use of reference characters in the present specification and drawings is intended to represent the same or analogous features or elements of the present invention.

DETAILED DESCRIPTION OF PARTICULAR EMBODIMENTS

Reference now will be made in detail to embodiments of the present disclosure, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same or similar elements throughout, FIG. 1 shows a schematic, cross-sectional view of an aeronautical gas turbine engine in accordance with an exemplary embodiment of the present disclosure. More particularly, for the embodiment of FIG. 1, the aeronautical gas turbine engine is a high-bypass turbofan jet engine 10, sometimes referred to herein as a "turbofan engine." As shown in FIG. 1, the turbofan engine 10 defines an axial direction A (extending parallel to a longitudinal centerline 12 provided for reference) and a radial direction R. In general, the turbofan engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. The compressor section, combustion section 26, turbine section, and exhaust nozzle section 32 together define at least in part a core air flowpath 37 through the turbomachine 16. A high pressure (HP) shaft or spool 34 (or rather a high pressure spool assembly, as described below) drivingly connects the HP turbine 28 to the HP compressor 24. A low pressure (LP) shaft or spool 36 drivingly connects the LP turbine 30 to the LP compressor 22.

The fan section 14 includes a fan 38 having a plurality of fan blades 40 coupled to a disk 42 in a spaced apart manner. The fan blades 40 extend outwardly from the disk 42 generally along the radial direction R. Each fan blade 40 is rotatable relative to the disk 42 about a pitch axis P by virtue of the fan blades 40 being operatively coupled to a suitable actuation member 44. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

The disk 42 is covered by rotatable front hub 48 aerodynamically contoured to promote an airflow through the plurality of fan blades 40. The fan section 14 further includes an annular fan casing or outer nacelle 50 that circumferentially surrounds the fan 38 and/or at least a portion of the turbomachine 16. The nacelle 50 is supported relative to the turbomachine 16 by a plurality of circumferentially-spaced outlet guide vanes 52. Moreover, the nacelle 50 extends over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66. Subsequently, the combustion gases 66 are routed through the HP turbine 28 and the LP turbine 30, where a portion of thermal and/or kinetic energy from the combustion gases 66 is extracted.

The combustion gases 66 are then routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust.

Still referring to FIG. 1, typically various operational aspects of a turbofan 10 are monitored and/or controlled by an electronic engine control system 100, such as a full authority direct engine control (FADEC) system or an engine control unit (ECU). The engine control system receives multiple input variables of current engine conditions from a distributed control module 102. These input variables may include air density, throttle level, engine temperatures, engine pressures, among others. Operating parameters for the turbofan 10 are computed and controlled based at least in part on these input variables. For example, an engine control system may control operating parameters such as fuel flow (i.e. throttle), engine starting and restarting, among other things, based on algorithms that depend on various input variables. A true FADEC system places full authority over turbofan operating parameters in the hands of the computer. If a total FADEC failure occurs, the engine fails. Conversely, an ECU allows for manual override.

A number of pressure sensors may provide inputs to the distributed control module 102. These pressure sensors may be configured and arranged to sense pressures at various locations throughout the core air flowpath 37 or elsewhere about the turbofan engine 10. As examples, pressure sensors may be configured and arranged to sense a compressor section pressure, a combustion section pressure, a turbine section pressure, a jet exhaust nozzle section pressure, and a bypass airflow pressure. The exemplary turbofan 10 includes a fan inlet pressure sensor (P20) 104, a high pressure compressor inlet pressure sensor (P25) 106, and a high pressure compressor outlet pressure sensor (Ps3/P3B) 108/110. As further examples, a compressor pressure sensor may include an LP compressor inlet pressure sensor, and an LP compressor outlet pressure sensor. The turbine section pressure sensor may include an HP turbine inlet pressure sensor, an HP turbine outlet compressor sensor, an LP turbine inlet compressor sensor, and an LP turbine outlet compressor sensor. Additionally, a plurality of pressure sensors may be located throughout or around any of these locations, such as annularly around the circumference or perimeter of the various sections of the turbofan and/or at various chambers within the various sections of the turbofan. Some or all of these pressure sensors may be mounted in the distributed control module 102 or in a separate pressure sensor unit that is physically separate from the electronic control system (FADEC or ECU). The pressure sensors, whether mounted in the distributed control module or other pressure sensor unit are electronically connected with the electronic control system by an electrical harness that transmits pressure sensor readings to the FADEC or ECU electronic control system.

Figure 2:
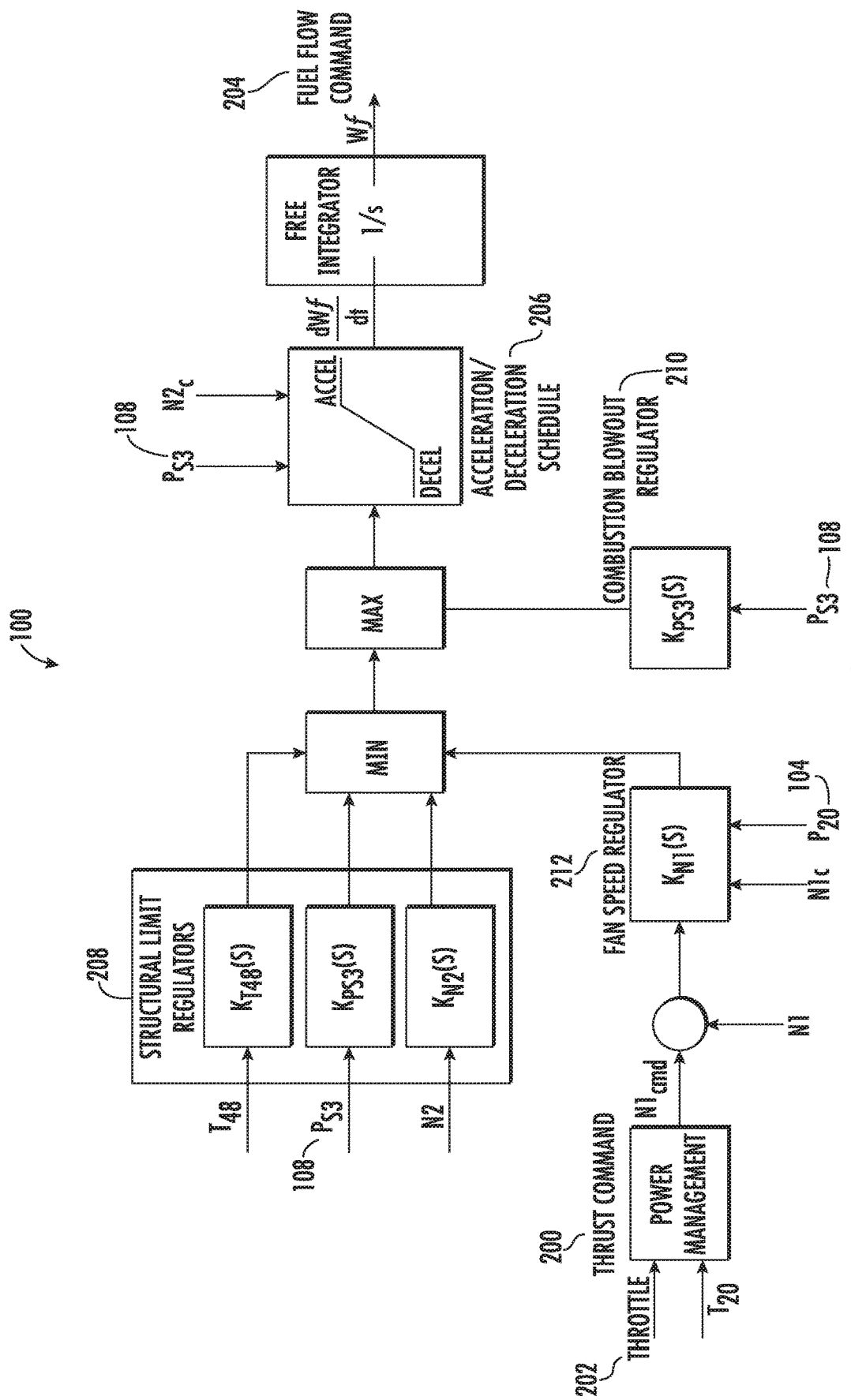
FIG. 2 is a flow chart of an exemplary control system for a gas turbine engine in accordance with various embodiments of the present disclosure.

Now referring to FIG. 2, an exemplary control system 100 provides a single throttle lever thrust command 200. Such a single throttle lever thrust command is characteristic of a turbofan 10 equipped with a FADEC system. The pilot or operator simply positions the throttle lever 202 to a desired detent such as start, idle, cruise power, or max power, and the control system 100 outputs a fuel flow command 204 automatically for the mode selected. The fuel flow command depends on an acceleration/deceleration schedule 206, which depends on an input variable from the high pressure compressor outlet pressure sensor (Ps3) 108. The acceleration/deceleration schedule 206 is augmented by structural limit regulators 208 and a combustion blowout regulator 210. These regulators 208, 210 also depend on input variables from the high pressure compressor outlet pressure sensor (Ps3) 108. The exemplary control system also includes a fan speed regulator 212, which depends on an input variable from the fan inlet pressure sensor (P20) 104. The exemplary control system 100 may also include an acceleration/deceleration schedule 206 and/or one or more regulators 208, 210, 212 that depend on an input variable from the high pressure compressor inlet pressure sensor (P25) 106 or any other pressure sensor within the contemplation of those skilled in the art. In various embodiments, a control system 100 may utilize input variables from any one or more pressure sensors, including by way of example, a compressor section pressure sensor, a combustion section pressure sensor, a turbine section pressure sensor, a jet exhaust nozzle section pressure sensor, and a bypass airflow pressure sensor.

One common operating parameter for a turbofan engine 10 is engine pressure ratio (EPR), which provides an indication of the power output of the turbofan. An EPR reflects the ratio of a turbine discharge pressure to a compressor inlet pressure, and may be calculated using inputs corresponding to the high pressure compressor inlet pressure sensor (P25) 106, and the high pressure compressor outlet pressure sensor (Ps3) 108. In some embodiments, the acceleration/deceleration schedule 206 in the exemplary control system shown in FIG. 2 may depend on EPR as an input variable.

Figure 3:
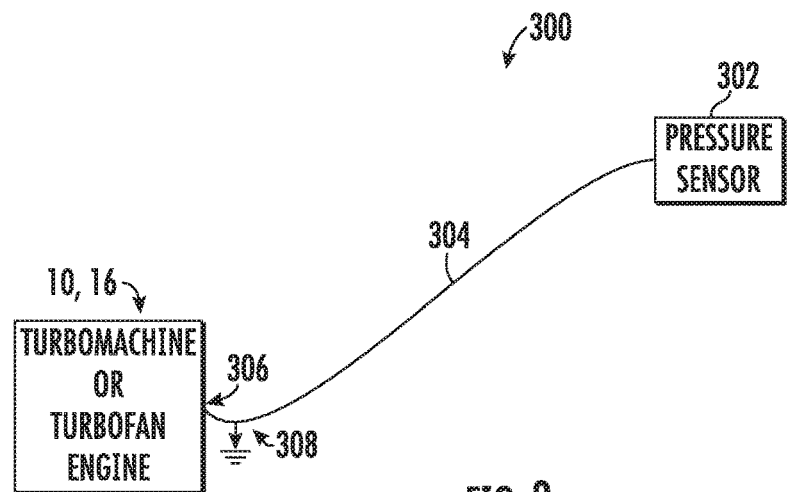
FIG. 3 is a simple schematic view of a pressure sensing system in accordance with an exemplary embodiment of the present disclosure.

In some embodiments a pressure sensor may be located remotely from a pressure source. For example, FIG. 3 shows a simple schematic view of a pressure sensing system 300, which includes a pressure sensor 302 and a pressure sensor supply line 304 that provides fluid communication between a pressure source 306 in a turbomachine 16 or turbofan engine 10 and a pressure port of the pressure sensor. A deflectable diaphragm deflects in response to pressure in the pressure port. The pressure supply line typically includes a weep hole 308 located at a low elevation point in the line. The weep hole allows moisture or condensation to drain out of the supply line.

As discussed herein, a pressure sensor may include a pressure port with an internal chamfer and/or a hydrophobic or superhydrophobic coating on at least a portion of one or more surfaces of the pressure sensor or pressure sensor supply line. The hydrophobic or superhydrophobic coating may be applied to at least a portion of the pressure port, the internal chamfer, and/or the deflectable diaphragm. These features may at least partially alleviate interference from condensing or freezing moisture. Pressure sensors used in turbomachine engines typically have pressure ports with very small diameters, which tend to act as capillaries. Without being bound to any theory, the presently disclosed internal chamfers and surface coatings may be configured to decrease the adhesive forces between condensation and surfaces inside the pressure port. This reduces the tendency for capillary action to hold or draw condensation into the pressure port. Instead, the presently disclosed internal chamfers and surface coatings may be configured at least partially to draw condensation away from the deflectable diaphragm and out of the pressure port utilizing capillary action, and/or to cause condensation to bead up and roll out of the pressure port before enough condensation accumulates to form a meniscus.

Figure 4A:
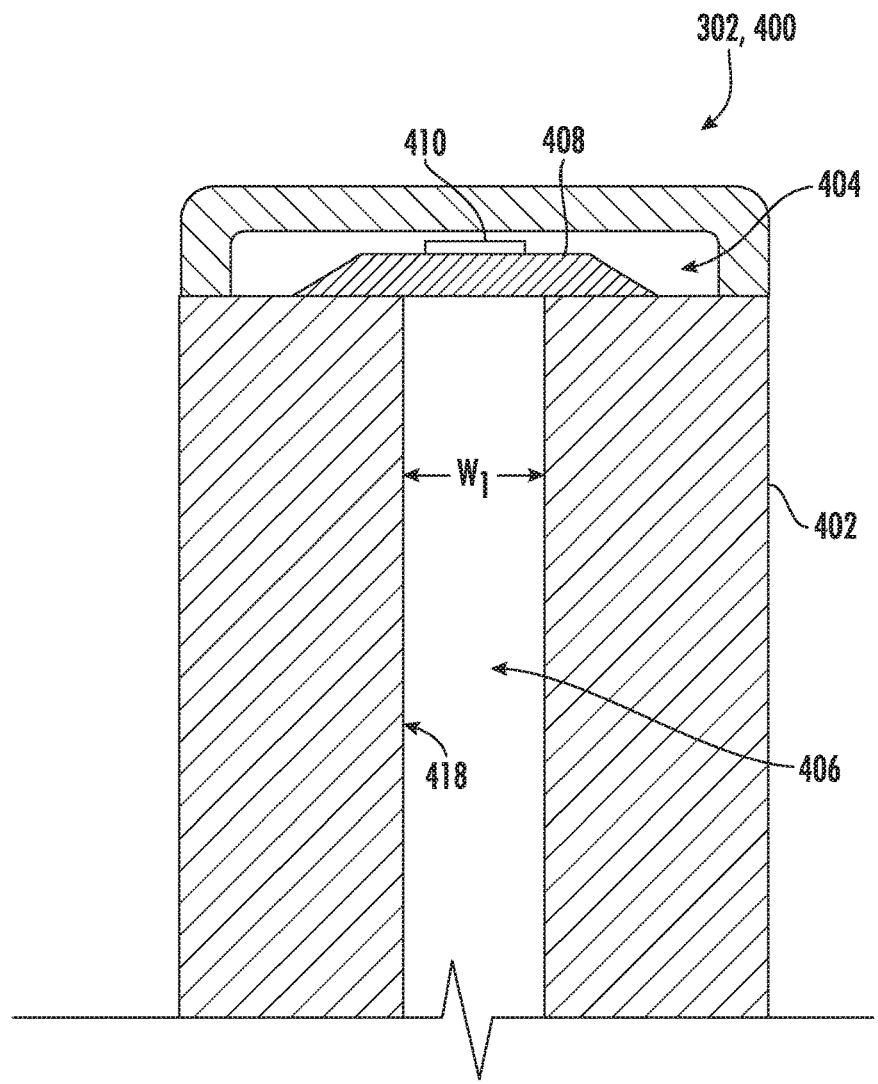
FIG. 4A is a schematic, cross-sectional view of a pressure sensing device in accordance with an exemplary embodiment of the present disclosure.
Figure 4B:
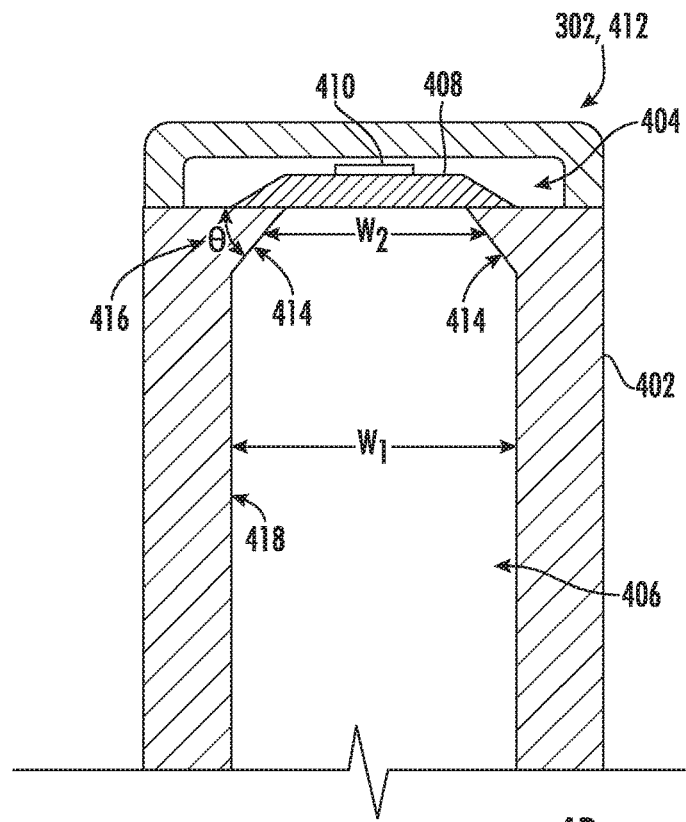
FIGS. 4B and 4C are schematic, cross-sectional views of pressure sensing devices, each in accordance with an additional exemplary embodiment of the present disclosure.
Figure 4C:
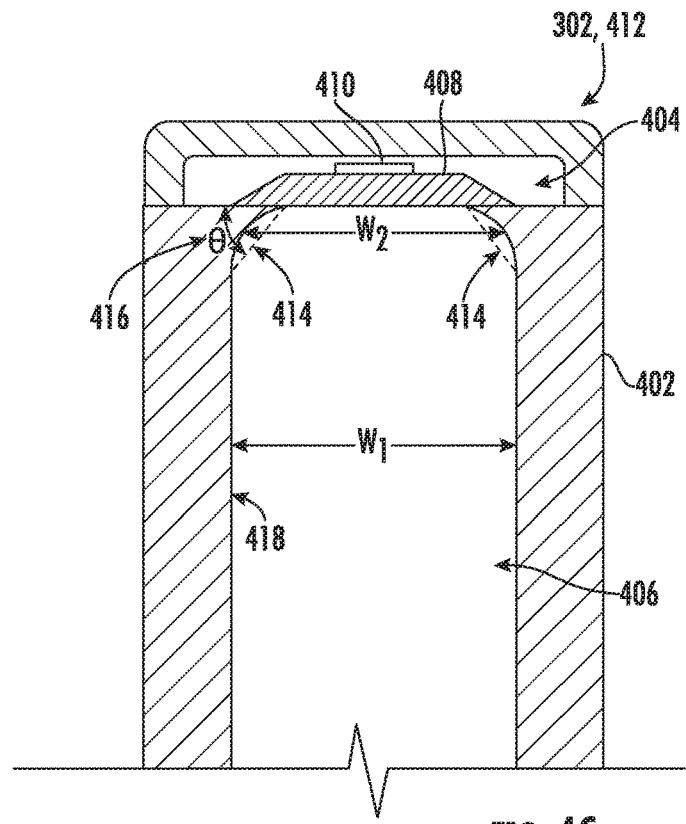

In various embodiments, the pressure sensor 302 may be configured as shown in FIG. 4A, 4B, or 4C. As shown in FIG. 4A, in one embodiment a pressure sensor 400 includes a housing 402 defining a pressure sensing chamber 404 and a tubular pressure port 406. A deflectable diaphragm 408 separates the pressure sensing chamber 404 from the tubular pressure port 406. The deflectable diaphragm is configured to deflect in response to pressure in the tubular pressure port. A sensing electrode 410 positioned adjacent to the deflectable diaphragm is configured to ascertain a capacitance value in response to a deflection of the deflectable diaphragm. The capacitance value corresponds to the pressure in the tubular pressure port. As shown in FIG. 4A, the tubular pressure port has substantially parallel walls perpendicular to the deflectable diaphragm. The tubular pressure port has a cross-sectional width W1 adjacent to the deflectable diaphragm. In some embodiments, this cross-sectional width W1 may range from about 0.02 to 0.12 inches, such as from about 0.03 to 0.08 inches. The tubular pressure port may have any desired cross-sectional profile, including circular, semi-circular, oval, rectangular, polyhedral, or combinations of these.

As shown in FIGS. 4B and 4C, in some embodiments a pressure sensor 412 may include a tubular pressure port 406 with an internal chamfer 414 adjacent to the deflectable diaphragm 408. The internal chamfer 414 may include a linear surface (FIG. 4B) or a curved surface (FIG. 4C). In some embodiments, the internal chamfer may have a slope or angle 416 relative to the deflectable diaphragm of about 10 to 80 degrees. For example, the internal chamfer may be between about 30 to 60 degrees, such as about 45 degrees. The internal chamfer defines a cross-sectional width, W2 at a first location proximal to the deflectable diaphragm. The cross-sectional width W2 of the internal chamfer increases from the width W2 proximal to the deflectable diaphragm to a cross-sectional width W1 at a second location distal to the deflectable diaphragm. In some embodiments, a tubular pressure port with an internal chamfer may have a cross-sectional width W2 proximal to the deflectable diaphragm of between about 0.02 to 0.12 inches, and a cross-sectional width W1 distal to the deflectable diaphragm of between about 0.08 to 0.35 inches, such as from about 0.08 to 0.18 inches, or about 0.15 to 0.25 inches.

Without being bound to any theory, it is believed that an internal chamfer may reduce adhesive forces between condensation droplets which may form at the corner or interface between the deflectable diaphragm and the pressure port. The adhesive force between a given droplet of condensation at the corner or interface between the deflectable diaphragm and the pressure port (i.e., a corner droplet) depends on the size of the contact area wetted by the corner droplet. The size of the contact area of a corner droplet depends on the slope of the tubular pressure port adjacent to the deflectable diaphragm. The size of the contact area decreases as this slope decreases from 90 degrees (as with a perpendicular interface) to something less than 90 degrees (as with an internal chamfer). This reduction in adhesive force attributable to an internal chamfer thus helps reduce the tendency for corner droplets to stick in the corner or interface between the deflectable diaphragm and the pressure port.

In some embodiments, the housing defining the tubular pressure port 406 may be formed from a glass or ceramic material that has a low coefficient of thermal expansion. The pressure sensor supply line 304 (FIG. 3) may be formed from a metal alloy, such as alloy steel or a superalloy such as an austenitic nickel-chromium-based superalloy. These materials are typically hydrophilic, and as such, in some embodiments condensing moisture may more readily wet the surface of the tubular pressure port and/or the pressure sensor supply line. Pressure sensors that have pressure ports or supply lines with hydrophilic surfaces are more prone to accumulate larger condensation droplets, which may inhibit the robustness or reliability of such pressure sensors if temperatures allow the retained water drops to freeze in particular locations and significant quantities.

In some embodiments a tubular pressure port and/or a deflectable diaphragm of a pressure sensor, or a portion thereof, may be coated with a hydrophobic or superhydrophobic coating. Similarly, in some embodiments a pressure sensor supply line may be coated with a hydrophobic or superhydrophobic coating. Such a coating may reduce the tendency for moisture to condense or freeze in the pressure port. As shown in FIGS. 4A and 4B, at least a portion of the surface of the tubular pressure port 406 may include a hydrophobic or superhydrophobic coating 418. Exemplary hydrophobic or superhydrophobic coating materials include a fluoropolymer, a polystyrene nano-composite, calcium carbonate particles, carbon nanotubes, silica nanoparticles, a fluorinated silane, and a hydrophobic oil.

These coatings increase the hydrophobicity of the surface of the tubular pressure port, thereby reducing adhesive forces between condensation and the surface of the tubular pressure port. Capillary action depends on a combination of surface tension caused by cohesion within the condensation droplets, and adhesive forces between the condensation droplets and the surface in contact with the droplets, which in this example would be the tubular pressure port. As a result of the reduced adhesive forces, condensation in the tubular pressure port exhibits an increased contact angle, thereby reducing the tendency for capillary action to draw condensation towards the deflectable diaphragm. Instead, the condensation more readily beads up on the surface of the tubular pressure port. Additionally, the increased contact angle reduces the critical size of the droplets at which point the force of gravity acting on the weight of the droplets exceeds the adhesive forces between the droplets and the surface of the tubular pressure port. This reduced critical droplet size increases the tendency for capillary action or gravity to draw the droplets or beads of condensation away from the deflectable diaphragm and out of the tubular pressure port.

Figure 5A:
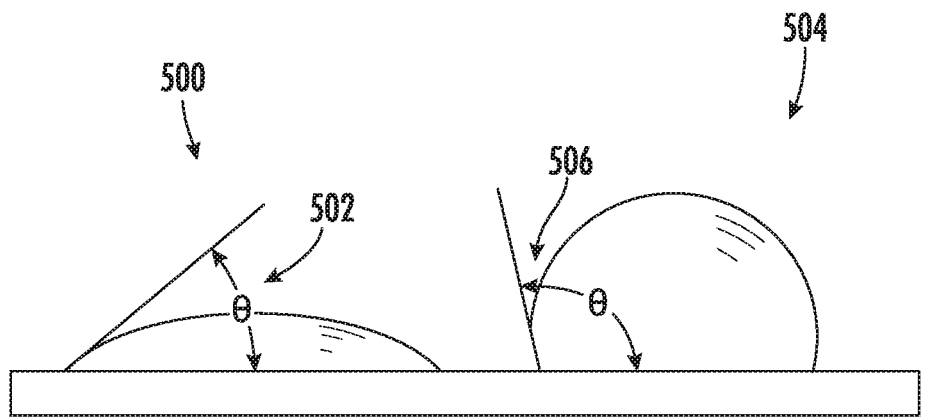
FIG. 5A is a schematic representation of a hydrophilic contact angle and a hydrophobic contact angle of a moisture droplet on a surface.

FIG. 5A is a schematic representation of a hydrophilic contact angle and a hydrophobic contact angle of a moisture droplet on a surface. A smaller contact angle indicates increased hydrophilicity, and a larger contact angle indicates increased hydrophobicity. Contact angles less than 90 degrees are regarded as hydrophilic, and contact angles greater than 90 degrees are regarded as hydrophobic. Contact angles greater than 150 degrees are regarded as superhydrophobic. With a hydrophilic surface 500, condensation exhibits a hydrophilic contact angle 502 of less than 90 degrees. Conversely, with a hydrophobic surface 504, condensation to exhibits a hydrophobic contact angle 506 of greater than 90 degrees. Likewise, with a superhydrophobic surface, condensation exhibits a contact angle 506 of greater than 150 degrees.

Figure 5B:
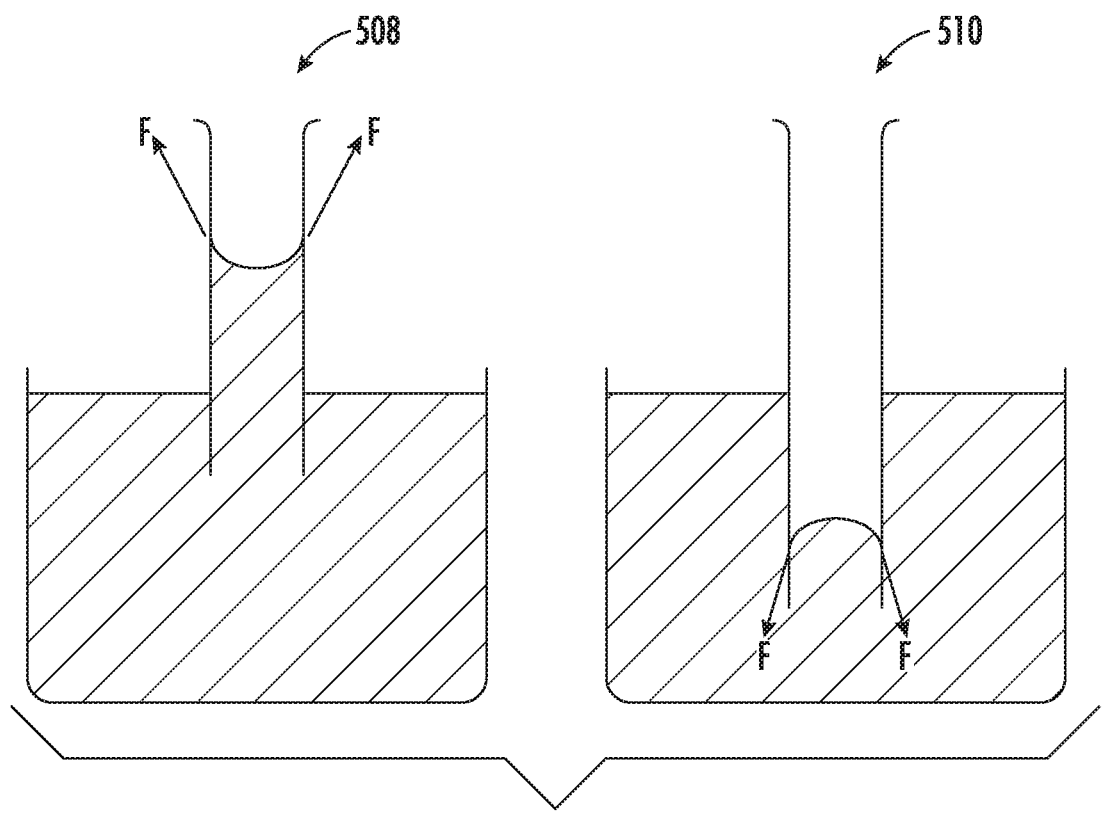
FIG. 5B is a schematic representation of capillary rise in a hydrophilic capillary tube and capillary fall in a hydrophobic capillary tube.

FIG. 5B is a schematic representation of capillary rise in a hydrophilic capillary tube 508 and capillary fall in a hydrophobic capillary tube 510. The hydrophilic capillary tube contains a fluid that exhibits capillary rise as a result of hydrophilic action from adhesive force between the tube and the fluid. The hydrophobic capillary tube contains a fluid that exhibits capillary fall as a result of hydrophobic action from adhesive force between the tube and the fluid. In some embodiments, when condensation forms a meniscus in a pressure port that has a hydrophobic or superhydrophobic surface treatment, the meniscus may exhibit capillary fall as a result of hydrophobic action, similar to the hydrophobic capillary tube 510. Without being bound to any theory, this capillary fall or hydrophobic action may at least partly draw condensation away from the deflectable diaphragm, and even sometimes causing the condensation to flow partially or entirely out of a pressure port. In this manner, a pressure sensor may have a hydrophobic surface that reduces the tendency for a meniscus to form in a pressure port, especially in contact with a deflectable diaphragm. This may help alleviate the possibility that condensation may freeze within the pressure port, and/or the possibility that freezing condensation may damage the deflectable diaphragm.

Figure 6A:
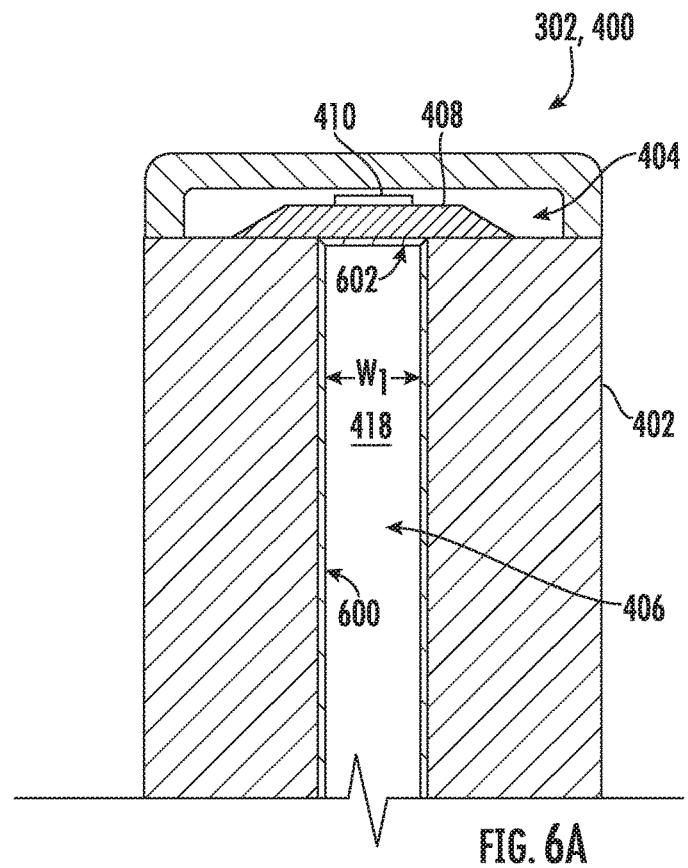
FIGS. 6A and 6B are schematic, cross-sectional views of additional exemplary pressure sensing devices in accordance with the present disclosure.
Figure 6B:
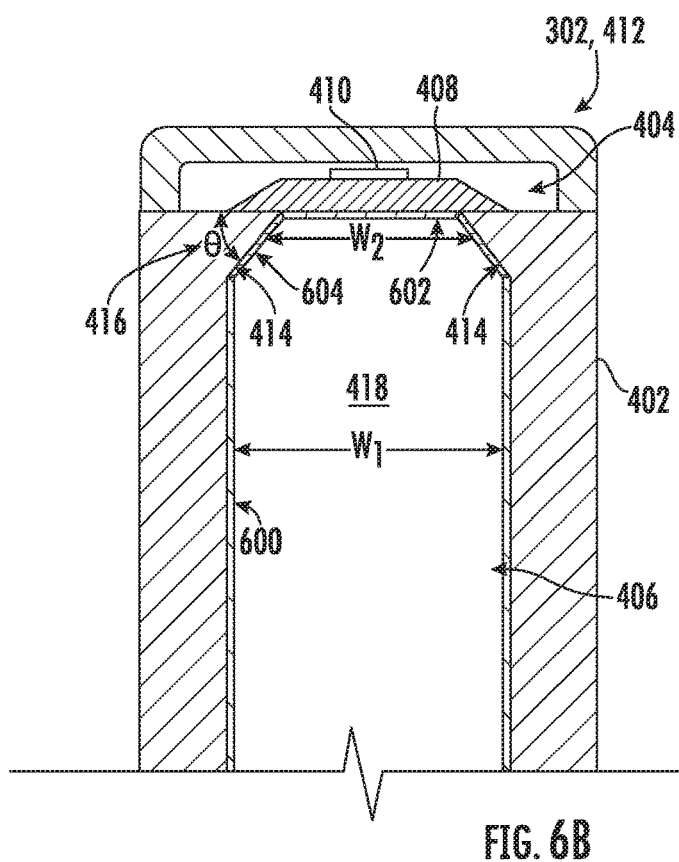

As shown in FIGS. 6A and 6B, a hydrophobic or a superhydrophobic coating 418 may be applied to at least a portion of respective surfaces of a pressure port, internal chamfer, and deflectable diaphragm. In one exemplary embodiment shown in FIG. 6A, a pressure sensor 400 may have a hydrophobic or superhydrophobic coating 418 that includes a first coating 600 applied to at least a portion of the surface of the tubular pressure port 406 and/or a second coating 602 applied to at least a portion of the surface of the deflectable diaphragm 408 facing the tubular pressure port. In another exemplary embodiment shown in FIG. 6B, a pressure sensor 412 may have a hydrophobic or superhydrophobic coating 418 that includes a first coating 600, a second coating 602, a third coating 604 applied to at least a portion of the surface of the internal chamfer 414, or combinations of these. The first coating 600, the second coating 602, and the third coating 604 may include one or more hydrophobic or superhydrophobic materials, and the materials selected for the first coating 600, the second coating 602, and the third coating 604 may be the same or different from one another.

In some embodiments, various aspects of the tubular pressure port, deflectable diaphragm, and/or internal chamfer may be coated with various hydrophobic or superhydrophobic materials selected to provide different degrees of hydrophobicity or superhydrophobicity as between these various aspects. For example, in some embodiments, a first coating 600 applied to at least a portion of the surface of the tubular pressure port 406 may exhibit a first contact angle, and a second coating 602 applied to at least a portion of the surface of the deflectable diaphragm 408 facing the tubular pressure port may exhibit a second contact angle. Additionally, in some embodiments a third coating 604 applied to at least a portion of the surface of the internal chamfer 414 may exhibit a third contact angle. The first contact angle, the second contact angle, and the third contact angle each may be hydrophobic or superhydrophobic.

In some embodiments, the hydrophobic effect of various surfaces of the tubular pressure port may be configured to draw condensation away from the deflectable diaphragm and out of the tubular pressure port. For example, without being bound to any theory, it is believed that condensing moisture may preferentially condense on surfaces with a lower hydrophobic effect, and that capillary action may preferentially draw condensation to a surface with a lower hydrophobic effect. Coatings may be applied to these various surfaces such that the hydrophobicity or superhydrophobicity of the second coating 602 as indicated by the second contact angle exceeds the hydrophobicity or superhydrophobicity of the first coating 602 as indicated by the first contact angle. Additionally or in the alternative, the hydrophobicity or superhydrophobicity of the third coating 604 as indicated by the third contact angle may exceed the hydrophobicity or superhydrophobicity of the first coating 602 as indicated by the first contact angle. Further, the hydrophobicity or superhydrophobicity of the third coating 604 may be less than the hydrophobicity or superhydrophobicity of the first coating 602. As such, the hydrophobic effect of the second coating 602 may be greater than the hydrophobic effect of the first coating 600 and/or of the third coating 604, and/or the hydrophobic effect of the third coating 604 may be greater than the hydrophobic effect of the first coating 600 and/or less than the hydrophobic effect of the second coating 602.

In some embodiments the second contact angle may exceed the first contact angle and/or the third contact angle by at least 5 degrees, 10 degrees, 25 degrees, 50 degrees, or even 60 degrees. Additionally, or in the alternative, in some embodiments the third contact angle may exceed the first contact angle by at least 5 degrees, 10 degrees, 25 degrees, 50 degrees, or even 60 degrees.

When the hydrophobic effect of the second coating applied to the deflectable diaphragm and/or of the third coating applied to the internal chamfer exceeds the hydrophobic effect of the first coating applied to the surface of the tubular pressure port, condensation may preferentially condense on the first coating of the tubular pressure port rather than on the internal chamfer or the deflectable diaphragm, and capillary action may preferentially draw condensation away from the deflectable diaphragm or internal chamfer and to the first coating on the tubular pressure port. Likewise, when the hydrophobic effect of the third coating exceeds the hydrophobic effect of the second coating, condensation may preferentially condense on the internal chamfer rather than on the deflectable diaphragm and capillary action may preferentially draw condensation away from the deflectable diaphragm and to the internal chamfer.

In some embodiments, the surface of the tubular pressure port may be coated with one or more hydrophobic or superhydrophobic materials that provide a hydrophobicity gradient inversely proportional to distance from the deflectable diaphragm. For example, a hydrophobicity gradient may increase from a first hydrophobicity as indicated by a first contact angle at a first location proximal to the deflectable diaphragm to a second hydrophobicity as indicated by a second contact angle distal to the deflectable diaphragm. The first contact angle and the second contact angle each may be hydrophobic or superhydrophobic. In some embodiments the hydrophobicity gradient may include a difference between the first contact angle and the second contact angle of at least 5 degrees, 10 degrees, 25 degrees, 50 degrees, or even 60 degrees. For example, a hydrophobicity gradient may range anywhere between greater than 90 degrees to nearly 180 degrees, such as between 91 degrees to 170 degrees, 91 degrees to 150 degrees, 125 degrees to 160 degrees, or 150 degrees to nearly 180 degrees.

In some embodiments, at least a portion of the interior of the pressure sensor supply line 304 (FIG. 3) may be coated with a hydrophobic or superhydrophobic material. The coating may be applied to the pressure sensor supply line with a configuration similar to as discussed herein with respect to the pressure sensor port, internal chamfer, and deflectable diaphragm. For example, in some embodiments, at least a portion of an inside surface of a pressure sensor supply line may be coated with one or more hydrophobic or superhydrophobic materials that provides a hydrophobicity gradient along a distance within the supply line. In some embodiments, the coating may be selectively applied around the weep hole 308 to preferentially draw condensation out of the weep hole. In some embodiments a hydrophobicity gradient may be configured to at least in part increase the tendency for capillary action or gravity to preferentially draw condensation out of the weep hole.

Figure 7B:
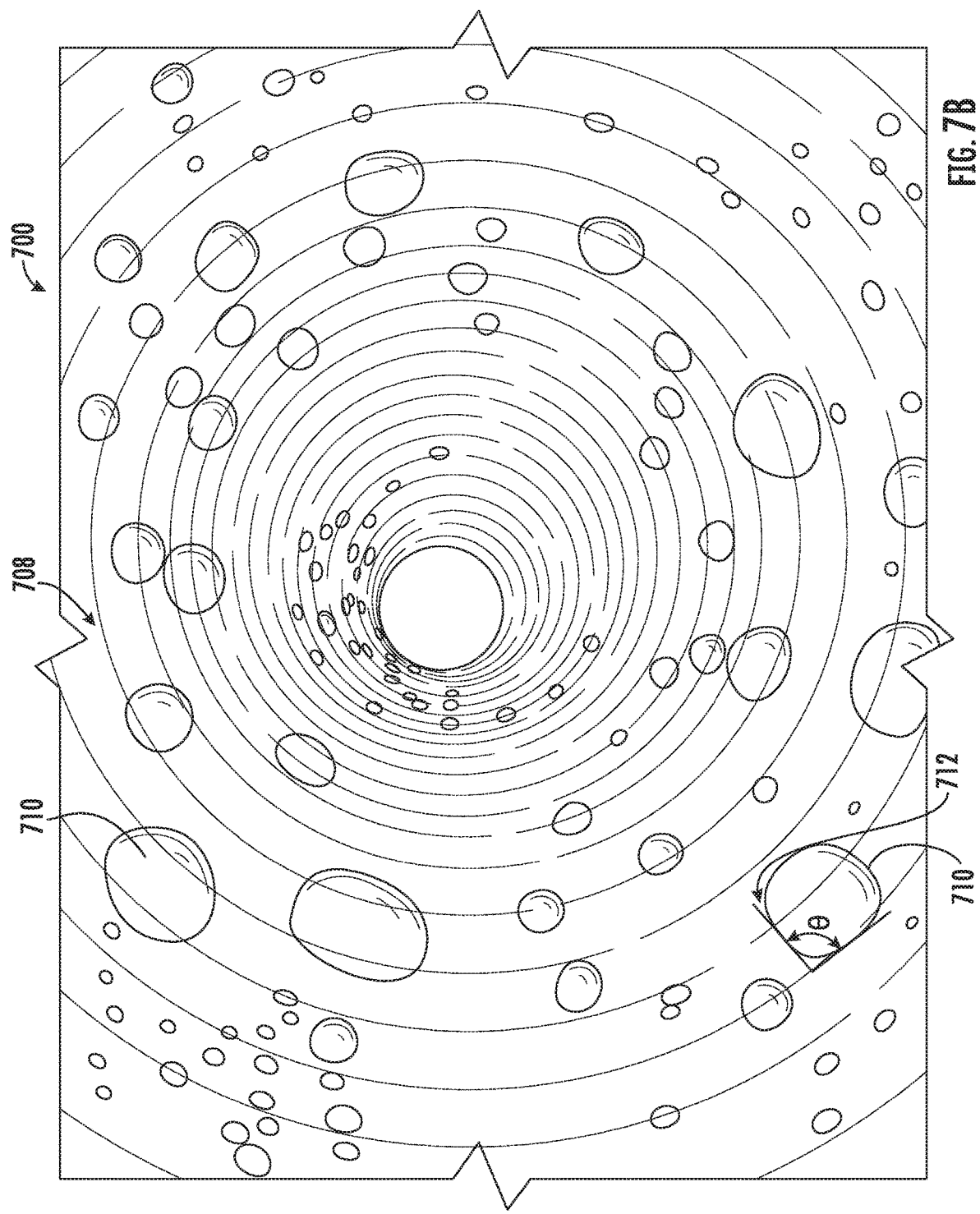
FIG. 7B shows moisture droplets condensed inside a tubular pressure port or supply line that has a hydrophobic or superhydrophobic surface in accordance with the present disclosure.

By way of illustration, FIG. 7A shows moisture droplets condensed inside a tubular pressure port or supply line 700 that has a hydrophilic surface 702. Condensation droplets 704 on the surface of the tubular pressure port 700 have a hydrophilic contact angle 706. For example, condensation droplets on this hydrophilic surface may exhibit contact angles ranging from zero to 90 degrees, such as from 30 degrees to 60 degrees. In contrast, FIG. 7B shows moisture droplets condensed inside a tubular pressure port or supply line 700 that has a hydrophobic or superhydrophobic surface 708. The surface has been made hydrophobic or superhydrophobic by a surface coating. Condensation droplets 710 on the surface of the tubular pressure port may have a hydrophobic contact angle or a superhydrophobic contact angle 712. For example, condensation droplets on a hydrophobic surface have a contact angle of 91 degrees or greater, such as 95 degrees or greater, 100 degrees or greater, or 125 degrees or greater. Condensation droplets on a superhydrophobic surface have a contact angle of 151 degrees or greater and up to nearly 180 degrees.

Pressure sensors may be provided in accordance with the present disclosure that include either a hydrophobic or superhydrophobic coating, an internal chamfer, or both of these features. In various embodiments these features may be configured to provide a combined effect to draw condensation away from the deflectable diaphragm and out of the pressure port.

Figure 8:
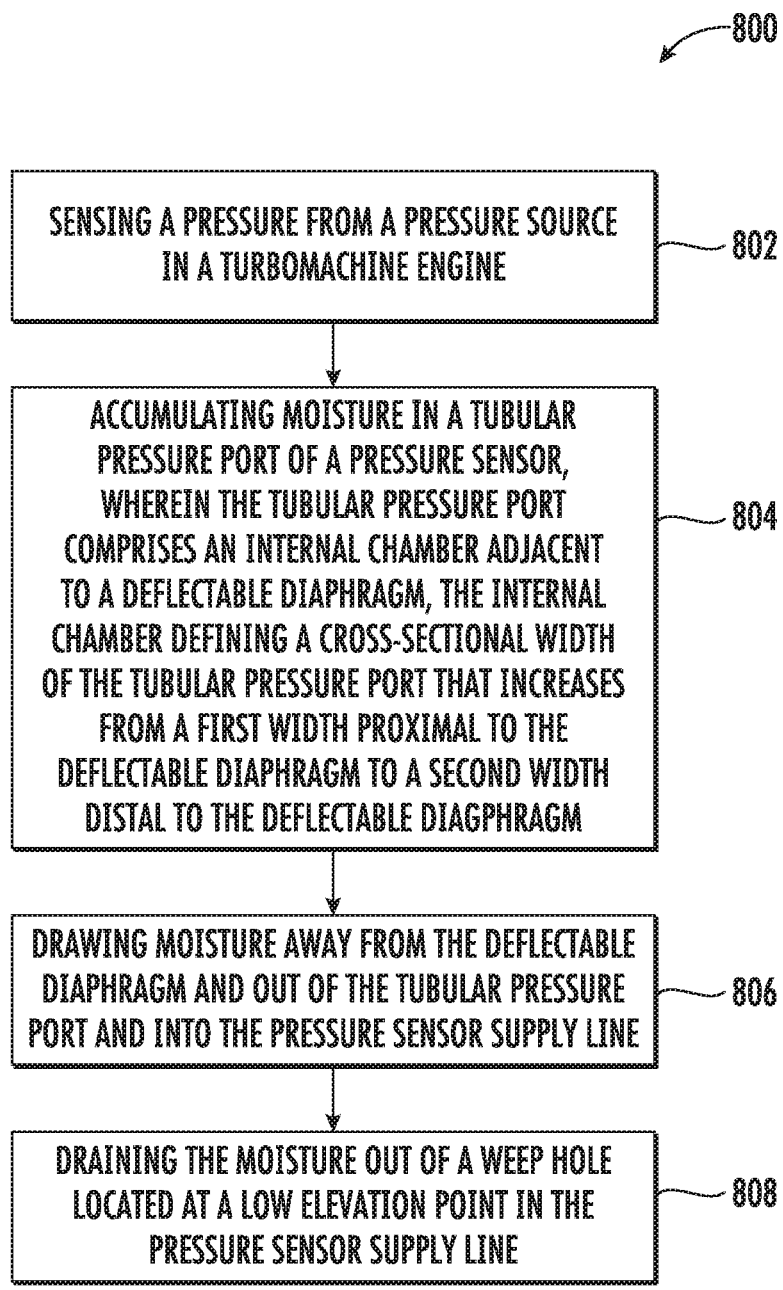
FIG. 8 is a flowchart that depicts a method of alleviating interference from moisture in a pressure sensing system.

FIG. 8 shows a flowchart that depicts a method 800 of alleviating interference from moisture in a pressure sensing system. The method may be implemented with pressure sensors used in connection with a turbomachine engine control system such as an FADEC system, or with pressure sensors used in connection with any other implementation that may be within the contemplation of those skilled in the art. The method 800 includes sensing a pressure from a pressure source in a turbomachine engine using a pressure sensor configured in accordance with the present disclosure. As examples, a pressure source may correspond to a location selected to provide pressure readings from a compressor section, a combustion section, a turbine section, a jet exhaust nozzle section, or a bypass airflow section of a turbofan engine.

By way of example, the pressure sensor may include: a housing defining a pressure sensing chamber and a tubular pressure port; a deflectable diaphragm separating the pressure sensing chamber from the tubular pressure port and configured to deflect in response to pressure in the tubular pressure port; and a sensing electrode configured to ascertain a capacitance value corresponding to the pressure in the tubular pressure port in response to a deflection of the deflectable diaphragm. As described herein, a pressure sensor supply line provides fluid communication between a pressure source in the turbomachine engine and the tubular pressure port of the pressure sensor.

The method continues with accumulating moisture in the tubular pressure port 804. In some embodiments, as described herein, the tubular pressure port may include an internal chamfer adjacent to the deflectable diaphragm defining a cross-sectional width of the tubular pressure port that increases from a first width proximal to the deflectable diaphragm to a second width distal to the deflectable diaphragm. Next, the method proceeds with at least partly drawing moisture away from the deflectable diaphragm and out of the tubular pressure port. The moisture may be drawn away from the deflectable diaphragm and out of the tubular pressure port and into the pressure sensor supply line 806 at least in part by reducing adhesive forces between the condensation and the surface of the tubular pressure port (and/or of the internal chamfer and/or deflectable diaphragm), reducing the tendency of capillary action to draw condensation towards the deflectable diaphragm, and/or increasing the tendency for capillary action or gravity to draw condensation away from the deflectable diaphragm and out of the tubular pressure port. The condensation drawn out of the tubular pressure port passes into the pressure sensor supply line. The method concludes with draining the moisture out of a weep hole located at a low elevation point in the pressure sensor supply line 808. In some embodiments, at least a portion of the tubular pressure port may have a hydrophobic or superhydrophobic coating. In various embodiments, the internal chamfer and/or the hydrophobic or superhydrophobic coating may individually or in combination increase the tendency for capillary action or gravity to draw condensation away from the deflectable diaphragm and out of the tubular chamfer.

The pressure sensors, systems, and methods disclosed herein may be used to improve the performance of a turbofan engine control system such as a FADEC system or an ECU, with or without a separate pressure sensor unit. The alleviation of interference from moisture in a pressure sensor system as described herein may reduce the possibility of erroneous pressure sensor signals or pressure sensor failures caused by moisture condensing or freezing in the pressure port or pressure supply line, thereby improving the reliability of turbofan engine control systems.

This written description uses exemplary embodiments to disclose the invention, including the best mode, and also to enable any person skilled in the art to practice the invention, including making and using any devices or systems and performing any incorporated methods. It should be appreciated that the exemplary turbofan engine 10 depicted in FIG. 1 is by way of example only, and that in other exemplary embodiments, aspects of the present disclosure may additionally, or alternatively, be applied to any other suitable gas turbine engine. For example, the turbofan engine 10 may not include one or more of the components described above, or, alternatively, may include additional components not described above. Additionally, for example, in other exemplary embodiments, the turbofan engine 10 may instead be any other suitable aeronautical gas turbine engine, such as a turbojet engine, turboshaft engine, turboprop engine, etc., or alternatively may be any gas turbine engine for use in aeroderivative industries, power generation industries, etc. As will be appreciated, the term "aeronautical gas turbine engine" refers generally to any gas turbine engine configured for use in an aircraft for powering such aircraft (i.e., generating thrust). The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A pressure sensing device, comprising:
   a housing defining a pressure sensing chamber and a tubular pressure port;
   a deflectable diaphragm separating the pressure sensing chamber from the tubular pressure port; and
   a sensing electrode configured to ascertain a capacitance value corresponding to the pressure in the tubular pressure port in response to a deflection of the deflectable diaphragm;
   wherein the tubular pressure port comprises an internal chamfer adjacent to the deflectable diaphragm, the internal chamfer defining a cross-sectional width of the tubular pressure port that increases from a first width proximal to the deflectable diaphragm to a second width distal to the deflectable diaphragm.

2. The pressure sensing device of claim 1, wherein the internal chamfer comprises a linear surface or a curved surface having a slope between 10 to 80 degrees.

3. The pressure sensing device of claim 2, wherein the first width of the internal chamfer is between 0.02 to 0.12 inches, and wherein the second width of the internal chamfer is between 0.08 to 0.18 inches, the second width being greater than the first width.

4. The pressure sensing device of claim 1, wherein at least a portion of the tubular pressure port, the internal chamfer, and/or the deflectable diaphragm comprises a hydrophobic or superhydrophobic coating.

5. The pressure sensing device of claim 4, wherein the hydrophobic or superhydrophobic coating comprises one or more of: a fluoropolymer, a polystyrene nano-composite, calcium carbonate particles, carbon nanotubes, silica nanoparticles, a fluorinated silane, and a hydrophobic oil.

6. The pressure sensing device of claim 4, wherein:
   the at least a portion of the tubular pressure port comprises a first hydrophobic or superhydrophobic coating exhibiting a first contact angle; and
   wherein the at least a portion of the internal chamfer comprises a second hydrophobic or superhydrophobic coating exhibiting a second contact angle, and/or the at least a portion of the deflectable diaphragm comprises a third hydrophobic or superhydrophobic coating exhibiting a third contact angle; and
   wherein the second contact angle exceeds the first contact angle and/or the third contact angle, and/or wherein the third contact angle exceeds the first contact angle.

7. The pressure sensing device of claim 2, wherein the internal chamfer and/or the hydrophobic or superhydrophobic coating are configured at least in part to reduce adhesive forces between the condensation and the surface of the tubular pressure port, to reduce the tendency for capillary action to draw condensation towards the deflectable diaphragm, and/or to increase the tendency for capillary action or gravity to draw condensation away from the deflectable diaphragm and out of the tubular pressure port.

8. A system for sensing pressure in a turbomachine engine, the system comprising:
   a pressure sensor comprising:
      a housing defining a pressure sensing chamber and a tubular pressure port;
      a deflectable diaphragm separating the pressure sensing chamber from the tubular pressure port; and
      a sensing electrode configured to ascertain a capacitance value corresponding to the pressure in the tubular pressure port in response to a deflection of the deflectable diaphragm; and
   a pressure sensor supply line providing fluid communication between a pressure source in a turbomachine engine and the tubular pressure port of the pressure sensor, wherein the pressure sensor supply line comprises a weep hole located at a low elevation point in the pressure sensor supply line; and
   wherein the tubular pressure port comprises an internal chamfer adjacent to the deflectable diaphragm, the internal chamfer defining a cross-sectional width of the tubular pressure port that increases from a first width proximal to the deflectable diaphragm to a second width distal to the deflectable diaphragm.

9. The system of claim 8, wherein the pressure source comprises a location selected to provide pressure readings for airflow discharging a compressor in the turbomachine engine.

10. The system of claim 9, wherein the compressor comprises a high pressure compressor or a low pressure compressor.

11. The system of claim 8, the internal chamfer comprises a linear surface or a curved surface.

12. The system of claim 8, wherein the internal chamfer has a slope between 30 to 60 degrees.

13. The system of claim 12, wherein the first width of the internal chamfer is between 0.03 to 0.08 inches, and wherein the second width of the internal chamfer is between 0.08 to 0.18 inches, the second width being greater than the first width.

14. The system of claim 8, wherein at least a portion of the tubular pressure port, the internal chamfer, and/or the deflectable diaphragm comprises a hydrophobic coating or a superhydrophobic coating.

15. The system of claim 14, wherein the hydrophobic or superhydrophobic coating comprises one or more of: a fluoropolymer, a polystyrene nano-composite, calcium carbonate particles, carbon nanotubes, silica nanoparticles, and a fluorinated silane.

16. The system of claim 14, wherein:
the at least a portion of the tubular pressure port comprises a first hydrophobic or superhydrophobic coating exhibiting a first contact angle; and
wherein the at least a portion of the internal chamfer comprises a second hydrophobic or superhydrophobic coating exhibiting a second contact angle, and/or the at least a portion of the deflectable diaphragm comprises a third hydrophobic or superhydrophobic coating exhibiting a third contact angle; and
wherein the second contact angle exceeds the first contact angle and/or the third contact angle, and/or wherein the third contact angle exceeds the first contact angle.

17. The system of claim 8, wherein the internal chamfer and/or the hydrophobic or superhydrophobic coating are configured at least in part to reduce adhesive forces between the condensation and the surface of the tubular pressure port, to reduce the tendency for capillary action to draw condensation towards the deflectable diaphragm, and/or to increase the tendency for capillary action or gravity to draw condensation away from the deflectable diaphragm and out of the tubular pressure port, the moisture passing into the pressure sensor supply line and out of the weep hole.

18. A method of alleviating interference from moisture in a pressure sensing system used in connection with a turbomachine engine control system, the method comprising:
sensing a pressure from a pressure source in a turbomachine engine using a pressure sensor, wherein the pressure sensor comprises:
a housing defining a pressure sensing chamber and a tubular pressure port;
a deflectable diaphragm separating the pressure sensing chamber from the tubular pressure port, the deflectable diaphragm configured to deflect in response to pressure in the tubular pressure port; and
a sensing electrode configured to ascertain a capacitance value in response to a deflection of the deflectable diaphragm, the capacitance value corresponding to the pressure in the tubular pressure port; and
wherein a pressure sensor supply line provides fluid communication between the pressure source in the turbomachine engine and the tubular pressure port of the pressure sensor;
accumulating condensation in the tubular pressure port, wherein the tubular pressure port comprises an internal chamfer adjacent to the deflectable diaphragm, the internal chamfer defining a cross-sectional width of the tubular pressure port that increases from a first width proximal to the deflectable diaphragm to a second width distal to the deflectable diaphragm;
drawing condensation away from the deflectable diaphragm and out of the tubular pressure port at least in part by reducing adhesive forces between the condensation and the surface of the tubular pressure port, reducing the tendency for capillary action to draw condensation towards the deflectable diaphragm, and/or increasing the tendency for capillary action or gravity to draw condensation away from the deflectable diaphragm and out of the tubular pressure port, the moisture passing into the pressure sensor supply line, wherein the internal chamfer at least in part contributes to the drawing; and
draining the condensation out of a weep hole located at a low elevation point in the pressure sensor supply line.

19. The method of claim 18, wherein at least a portion of the tubular pressure port, the internal chamfer, and/or the deflectable diaphragm comprises a hydrophobic coating or a superhydrophobic coating, and wherein the hydrophobic or superhydrophobic coating further contributes at least in part to the drawing.

20. The method of claim 18, wherein the pressure source comprises a compressor section in the turbomachine engine.

* * * * *